Figure 1:
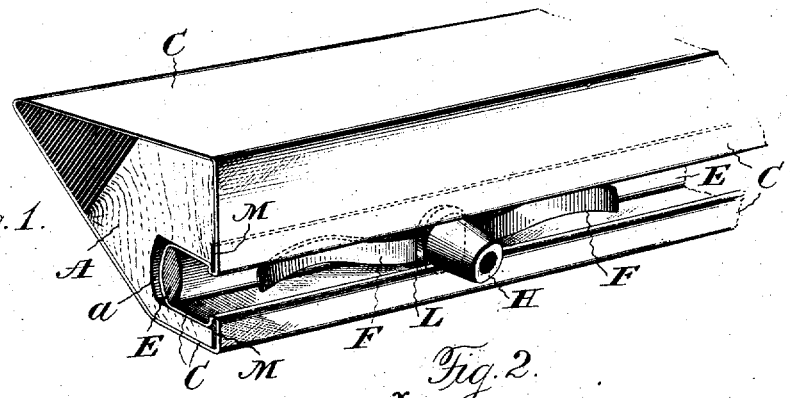

No. 11,799. Reissued Jan. 2, 1900.

G. KERN.

BILLIARD CUSHION.

(Application filed Mar. 18, 1899.)

Witnesses:

Jas. E. Hutchinson.

Henry C. Hazard

Inventor.

Gottlieb Kern, by

Prindle and Russell, his Attys

UNITED STATES PATENT OFFICE.

GOTTLIEB KERN, OF OMAHA, NEBRASKA, ASSIGNOR, BY DIRECT AND MESNE ASSIGNMENTS, TO ROBERT WASHINGTON MOFFETT, OF CHICAGO, ILLINOIS.

BILLIARD-CUSHION.

SPECIFICATION forming part of Reissued Letters Patent No. 11,799, dated January 2, 1900

Original No. 618,574, dated January 31, 1899. Application for reissue filed March 18, 1899. Serial No. 709,682.

*To all whom it may concern:*

Be it known that I, GOTTLIEB KERN, of Omaha, in the county of Douglas, State of Nebraska, have invented certain new and useful Improvements in Billiard-Table Cushions, for which Letters Patent No. 618,574 were issued upon the 31st day of January, 1899, which Letters Patent have been found to be inoperative and invalid and not to cover fully the invention set forth in the specification and shown in the drawings which were filed by me in the Patent Office upon the 25th day of March, 1898, preparatory to the obtaining of the said Letters Patent. Now, therefore, being desirous of reissuing the said Letters Patent I have prepared and do hereby declare the following to be a full, clear, and exact description of the said improvements, reference being had to the accompanying drawings, in which—

Figure 2:
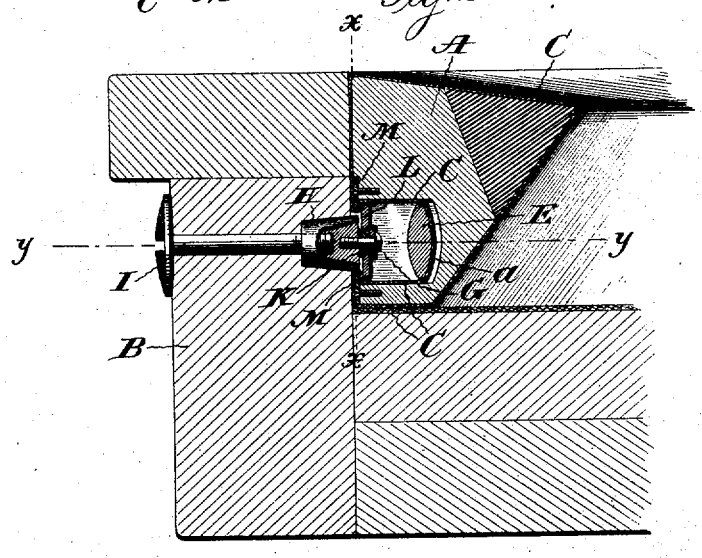
Figure 3:
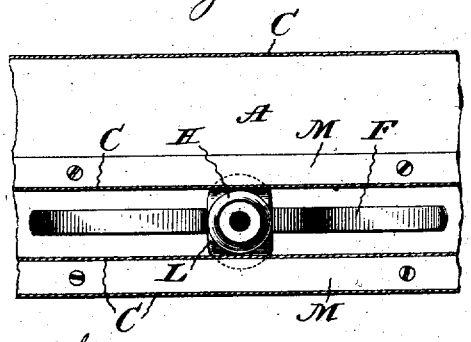
Figure 4:
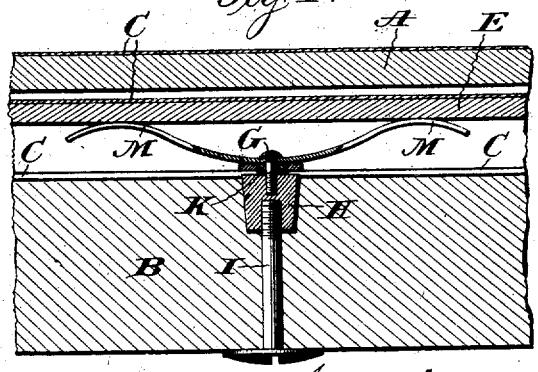

Figure 1 is a perspective view of a portion of a billiard-table cushion embodying my invention and shown detached from the table; Fig. 2, a cross-section of the same shown applied to the table; Fig. 3, a vertical section on the line *x x* of Fig. 2; and Fig. 4 is a horizontal section on the line *y y* of Fig. 2.

Letters of like name and kind refer to like parts in all of the figures.

The object of my invention is to provide an improvement in the construction of billiard-table cushions whereby when the cloth coverings thereof become worn at the edges of the cushions they may be moved or shifted, so that the worn places may be moved away from such edges and a fresh or unused portion substituted, thus enabling a single piece of cloth to be used on a cushion a very long time; and to these ends said invention consists in the features of construction and combination of parts substantially as hereinafter specified.

The cushion A is, as is common, composed of a bar or bars and is of usual form in cross-section, except that on its side next to the table-rail B it has a longitudinal groove *a*. Extending around the cushion, over all four sides thereof, and into the groove *a* is a covering of cloth C. The sum of the sides of the cloth is less than the sum of the sides of the cushion plus the top and bottom of the groove *a*, so that a device may be applied to the portion of the cloth within the groove *a* to press it inward, and thus stretch or tightly draw the cloth around the cushion without the device-engaged portion touching or coming in contact with the inner or side wall of said groove. Said device is in the form of a bar E, one side of which engages the portion of the cloth within the groove *a* and is itself engaged on its opposite side by the ends of a bowed spring F, that at or near its longitudinal center is attached by a screw G to the outer end of a tapering or conical block H, seated in an opening in the inner side of the table-rail B and held there by a screw I, that passes horizontally through said rail and engages a threaded opening in the inner end of said block. Swiveled or mounted to turn freely on a washer K on the screw G, between the spring and the block, is an oblong plate L, that forms a turn-button whose opposite ends in its longer dimension are adapted to respectively engage the inner sides of flat rods M and M, that are secured to the inner side of the cushion and project or overhang the top and bottom of the groove *a*. The shortest dimension or width of the plate or turn-button is less than the distance between the two rods M and M.

If it be desired to place a new or fresh portion of the cloth C at the ball-striking edge or corner of the cushion, the method of procedure is as follows: Each screw I is removed to detach the cushion from the rail, and the cushion is then removed to give access to the turn-button L. Said turn-button is rotated to disengage the ends thereof from the plates M and M and permit it to pass outward from the groove *a*. This frees the bar E from the spring F and relaxes the cloth, and the latter from end to end can then be shifted around the cushion to present the desired new wearing-surface at the edge or corner. By a reversal of these operations the turn-button is forced back into the groove *a*, so that the spring F is made to bear against the bar E to place the cloth again under tension, and the turn-button is again reëngaged with the bars M and M to maintain the spring in place under stress and connect the conical block with the cushion, so that by means of the screw I the cushion may be again fastened to the table-rail.

Having thus described my invention, what I claim is—

1. A billiard-table cushion having a ball-engaging covering that is continuous around it, is shiftable to present different portions for wear at different times, and has means for holding said covering at the place to which it may be shifted, the edge-engaging portion of the cover from end to end being shiftable, whereby different portions of the cover may be placed over the edge of the cushion at different times, substantially as and for the purpose described.

2. The combination of a billiard-table cushion, a covering that surrounds it and is shiftable around it, and means for stretching and holding said covering, the edge-engaging portion of the cover from end to end being shiftable, whereby different portions of the cover may be placed over the edge of the cushion at different times, substantially as and for the purpose described.

3. The combination of a billiard-table cushion having a groove, a covering extending partially into the groove, and means for placing the portion in the groove under tension, substantially as and for the purpose specified.

4. The combination of a billiard-table cushion, having a groove, a covering extending entirely around said cushion, and means for applying pressure to the portion of the covering crossing the groove, substantially as and for the purpose described.

5. The combination of a billiard-table cushion, having a longitudinal groove, but with a portion not reaching the inner wall of the groove, a covering extending in said groove, a bar engaging the portion of the covering in the groove, and means for applying pressure to and maintaining it upon said bar, substantially as and for the purpose described.

6. The combination of a billiard-table cushion, having a longitudinal groove, a covering extending in said groove, a bar engaging the portion of the covering in the groove, a spring engaging said bar, a turn-button to receive the thrust of the spring, and parts on the cushion on opposite sides of the groove, to cooperate with the turn-button, substantially as and for the purpose described.

7. The combination of a billiard-table cushion having a longitudinal groove, a covering extending in said groove, rods projecting over said groove, a bar bearing against the cover in the groove, a spring to hold the bar against said cover, and a locking device to receive the thrust of the spring, that engages said rods, substantially as and for the purpose described.

8. In a billiard-table, the combination of the rail, the cushion having a longitudinal groove at the side next the rail, rods projecting over said groove, a cover around the cushion, a bar bearing against the cover in the groove, a block means for securing it to the rail, a spring secured to the block and engaging the bar, and a turn-button connected to the block, and coöperating with said rods, substantially as and for the purpose described.

In testimony whereof I hereunto set my hand this 8th day of March, A. D. 1899.

GOTTLIEB KERN.

Witnesses:
RUDOLPH NOAOK,
CHARLES A. LUCKE.